Aug. 3, 1965 B. LORENZ ETAL 3,197,890
ANIMATED TRANSPARENCY FOR TEACHING
FOREIGN LANGUAGES DEMONSTRATOR
Filed Oct. 3, 1962 9 Sheets-Sheet 1

INVENTORS
BEN LORENZ
JAMES W. BARRY
BY
Lawrence S. Epstein
ATTORNEY

Fig. 3

INVENTORS.
BEN LORENZ
JAMES W. BARRY
BY
Lawrence S. Epstein
ATTORNEY

INVENTORS.
BEN LORENZ
JAMES W. BARRY
BY
Lawrence S. Epstein
ATTORNEY

INVENTORS.
BEN LORENZ
JAMES W. BARRY
BY
Laurence S. Epstein
ATTORNEY

United States Patent Office 3,197,890
Patented Aug. 3, 1965

3,197,890
ANIMATED TRANSPARENCY FOR TEACHING FOREIGN LANGUAGES DEMONSTRATOR
Ben Lorenz, Katonah, and James W. Barry, Roslyn, N.Y., assignors, by direct and mesne assignments, to the United States of America as represented by the Secretary of the Navy
Filed Oct. 3, 1962, Ser. No. 228,208
19 Claims. (Cl. 35—35)

This invention relates to a language teaching device, and particularly to teaching language by means of the visual demonstration of the vocal organs which are used in the formation of speech sounds. The device is especially adapted for teaching languages and is accomplished by use of the overhead projector in the classroom.

In teaching languages, or more generally, in the formation of sounds, the function of the vocal organs in their almost infinite number of positions and shapes has never heretofore been visually demonstrated. The instructor usually illustrates the sound by word description and some visual charts. The precise interrelationships of all speech organs, in expressing sound, must be fully understood for the student to repeat the sound made by the instructor.

With this requirement in mind, it was decided to design a device which could combine sound producing organs and their movements in one device with a minimum of separable accessories. This approach was rigidly followed and resulted in the device of the invention which shows a cross-section of the head and neck together with the speech organs therein and utilizing only ten controls; one to operate the jaw, one the upper lip, one for both lips, one for the uvula, one as a symbolic representation of the vocal cords, and five controls for the tongue itself. Since the device is designed to demonstrate the speech movements of the voice organs it can be used to demonstrate the formation of sound in any language. The instructor can move, stop, and repeat movements as he wishes or as the problem and student's questions dictate. The lecturer himself could add pertinent sounds as he operates the device. The mouth on the device can be opened or closed by jaw movement; the lips can be spread, relaxed, moved forward and compressed; the uvula can be moved to open or to close the nasal resonance cavity and can be vibrated to demonstrate rolling sounds. The vocal "cords" can be moved to demonstrate voiced sounds or can be kept motionless and out of student vision for unvoiced movement. A plastic dial ring containing the International Phonetic Alphabet, with associated coded numbers, is a permanent part of the device. Beside each symbol of the phonetic alphabet numbers are provided. The various positions of each of the control levers are also numbered. The instructor, or any operator, can easily set the control levers to correspond with the numbers adjacent to the phonetic alphabet symbol to pictorially illustrate position of the speech organs to produce the symbolic sound represented by the alphabet symbol. The phonetic symbols are grouped together on the dial according to the pertinent sound group, such as, nasal, bi-labial, back vowels, palatial, etc. so that the International Phonetic Alphabet character is projected on the screen with the organ image selected by the operator.

Three slides of the three pre-selected positions on the top view of the tongue are included and attached to the device and can be revealed by sliding a control button. The instructor can use any one of these three to show the appropriate top view of the projected side view of the tongue.

No control movement or component is mechanically linked to another speech organ component, so that each degree of movement is directly under the control of the operator. This allows each degree of movement to be demonstrated, tested or repeated without disturbing or affecting any other organ position.

The only accessory to the device is a unit to allow the operator to show sound aspiration, and its degree, which can be important in describing the production of certain sounds.

It is an important object of the invention to provide a device capable of demonstrating the many forms the mouth and tongue assume in the formation of sounds.

It is another object to provide a language demonstrator, and one particularly capable for use in depicting foreign language sounds, for student instruction and training.

It is yet another object to provide means to teach foreign languages to students whereby the formation of the tongue and mouth are visually depicted by the instructor by external means, so that a vivid picture is provided the student.

It is still another object to provide a language demonstrator device adapted for overhead projection, whereby the precise interrelationship of all the organs used to express speech sound may be projected on a screen for either individuals or groups.

It is yet another object to provide individual controls for each degree of movement without interlinkage. In this manner each degree of movement may be demonstrated or repeated, without disturbing any other organ position.

And it is yet another object to permanently attach and directly associate the International Phonetic Alphabet with the device and to correlate the position of the vocal organs with the phonetic sound by means of a numerical key. This will enable the student or instructor to simulate correct position of the human mouth and tongue automatically so that no error is possible.

It is still another object to illustrate visually an aspirated sound by means of a suitable presentation via the overhead projector.

Other objects and many of the attendant advantages of this invention will be readily appreciated as the same becomes better understood by reference to the following detailed description when considered in connection with the accompanying drawings wherein:

FIG. 4 is a view of the mouth and tongue as seen on the overhead projector, and depicting the sound illustrated in FIG. 3;

Figure 1:
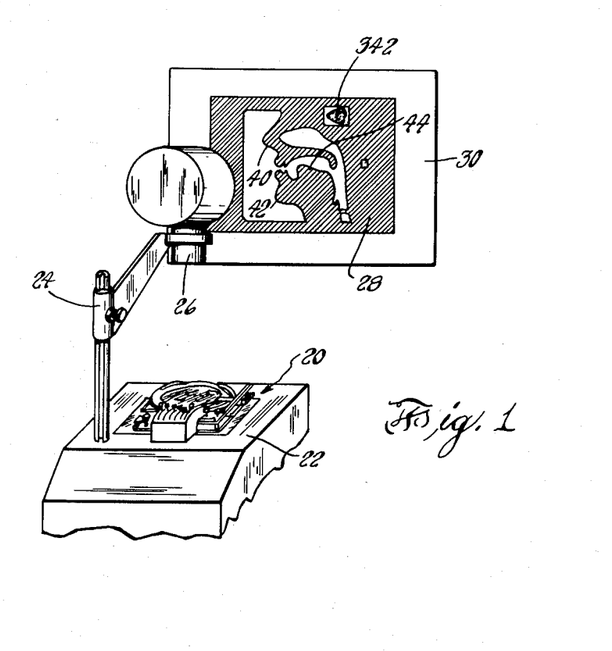
FIG. 1 is a perspective view of the invention used with an overhead projector.

Referring to the figures and particularly to FIG. 1, the language demonstrator 20 is illustrated in position on the table 22 of an overhead projector 24. The overhead projector 24 is of standard design and is provided with a light below (not shown) which illuminates the transparent language device 20 so that a lens 26, positioned overhead, in spaced apart relation, is able to project the image 28 on a screen 30.

This type of visual projection is well known and is often used in classrooms to teach any number of students. The transparent language teaching aid and speech training device 20 is illustrated in plan view in FIG. 2 and represents an operating cross-sectional view of the human voice and speech cavity including all organs used in speech. The device, as constructed, and as will presently become clear, teaches correct voice production and pronunciation, especially in foreign languages. Many foreign words are made with sounds which do not have an equivalent in the English language. Creating a sound by imitation of a native born speaker frequently is not accurate enough to reproduce the subtleties that exist in that language. Visual correlation of the organs utilized to obtain the sound is helpful to an understanding of how the sound of the language is physically produced.

As may be clearly seen from FIGS. 2, 3, 6, 7 and 8, a base plate 32 of clear plastic material is provided and has secured thereto a tinted plastic plate 34. The supporting legs 36 extend below the base plate 32 and support the device in a slightly raised position. The thin metal opaque plate number 38 is designed to act as a frame around the transparent area and is firmly secured to the tinted plastic plate 34. The operating elements utilized to actuate the device of the invention are designed to overlie the opaque frame portion of member 38 and are therefore not visible on the screen.

Figure 2:
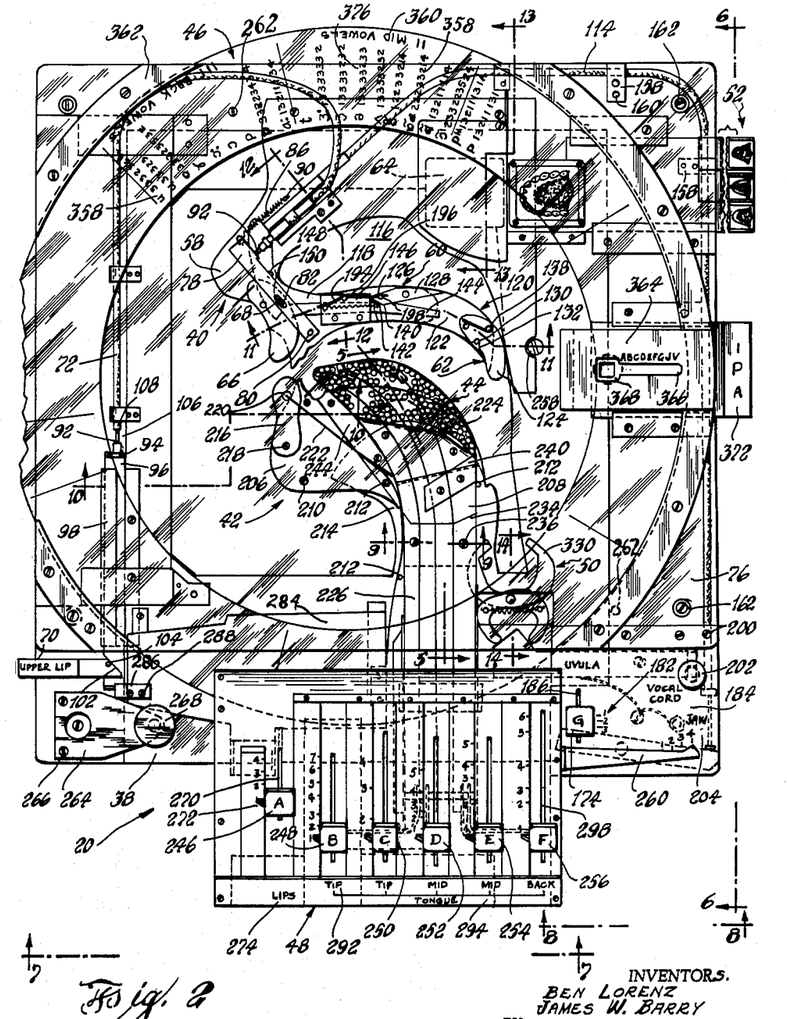
FIG. 2 is a plan view of the device of the invention with the parts illustrating a sound.
Figure 9:
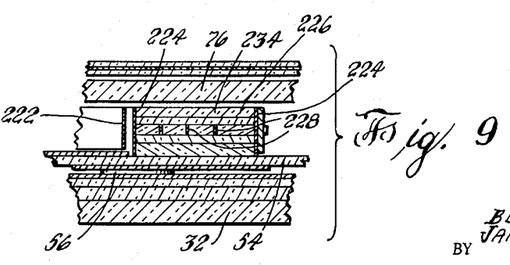
FIG. 9 is an enlarged section of the mechanism controlling the tongue movement and is taken on line 9—9 of FIG. 2.
Figure 10:
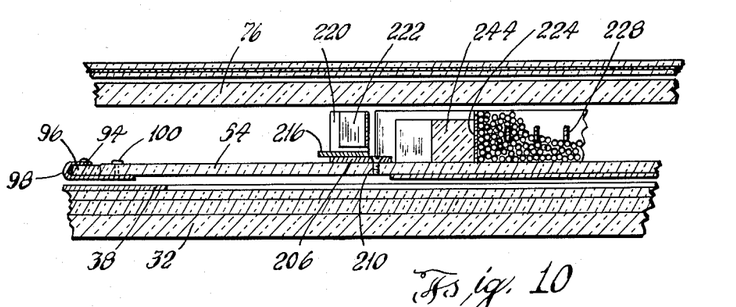
FIG. 10 is an enlarged section of the mechanism controlling the movement of the lips, and is taken on line 10—10 of FIG. 2.
Figure 11:
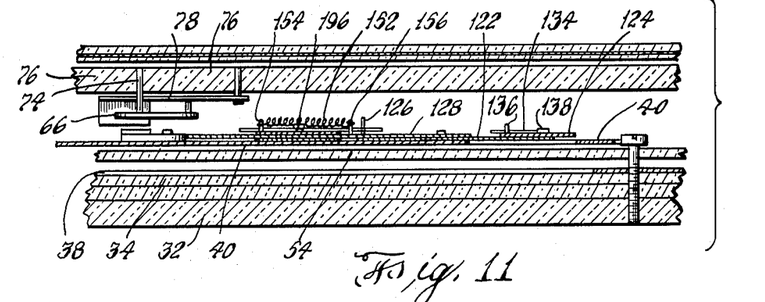
FIG. 11 is an enlarged section of the upper lip and uvula and is taken on line 11—11 of FIG. 2.
Figure 12:
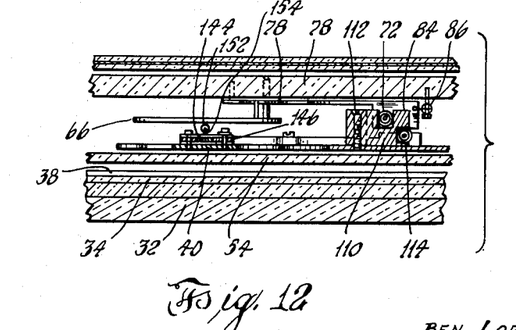
FIG. 12 is an enlarged section of the upper jaw and is taken on line 12—12 of FIG. 2.
Figure 13:
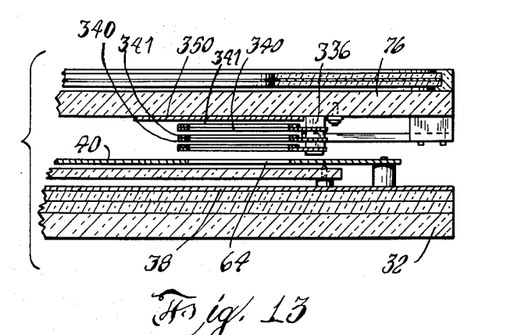
FIG. 13 is an enlarged section of the International Phonetic Alphabet disk and is taken on line 13—13 of FIG. 2.
Figure 14:
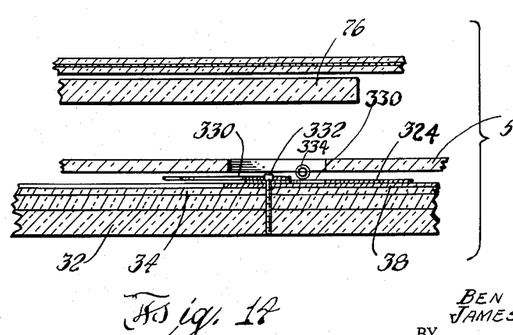
FIG. 14 is a section taken on line 14—14 of FIG. 2 and illustrates the construction of the simulated vocal chord.

Referring to FIG. 2, the language device 20 comprises a simulated upper jaw member 40, a lower jaw member 42 with the simulated tongue 44 and an index chart 46, provided to show the symbols and control code comprising the International Phonetic Alphabet. The controls for the lower jaw 42 and the tongue 44 are provided at 48 and are outside the visual portion projected on the screen 50. In addition, a symbolic representation of the vocal cords is provided at 50. Further, a top view of the position of the tongue is its relation to the upper teeth, is provided for visual observation at 52. Referring to FIGS. 2, 3, 11 and 12, the construction of the upper jaw member 40 is illustrated in detail. The clear plastic jaw plate 54 is rectangular in shape and is larger than and overlies the tinted plastic plate in spaced apart relation by means of the washers 56 (see FIG. 9). The plastic jaw plate 54 supports both the upper and lower jaw members, as well as the tongue. The upper jaw member 40 simulates part of the human face, including the nose 58 when viewed on the overhead screen. The hard palate 60 and the soft palate or uvula 62 extend inwardly into the mouth cavity 116. The jaw member 40 is provided with a window cutout 64, for a purpose soon to be described. This window portion 64 is positioned in the jaw member 40 so that it is normally not visible on the screen, and is utilized to illustrate other factors involving the learning of languages, as appropriate. An upper lip member 66 is operably connected at 68 to the control member 78 and is capable of being actuated by a separate upper lip control means 70, or by means of the control 246 in the control member 48. A cable member 72, somewhat in the manner of a camera cable, is actuated by movement of the upper lip control means 70 to provide the mechanism necessary to move the upper lip 66. As is best illustrated in FIGS. 2 and 11, the upper lip member 66 is suspended at 74 from the upper support and spacer plate member 76. This spacer plate member is of clear plastic and supports various members of the upper and lower jaw as well as the index chart member 46. Overlying the upper lip member 66 is the control member 78, pivotally secured at one end at 80, to the spacer plate member 76. The lost motion slot 82, in the lip control member 78 receives the upper free end of the pivot pin 68 to allow movement of the upper lip member when the cable 72 is actuated by the control means 70. The depending flange portion 84 at the free end of the lip control member 78 receives one end of a tension spring 86. The other end of the tension spring 86 is fixed to a securing pin 90 attached to the upper spacer plate member. The plunger 92 extending through the cable member 72 is provided with an enlarged abutment 94 to constantly beat against the slide bar 96 retained in the elongated track member 98. The latter is fastened at 100 to the plastic jaw plate member 54 against accidental movement thereof. The slide bar 96 is provided with a cam surface 102 upon which the cam follower 104, contained on the upper lip member 70, follows. The spring 106 is retained on the plunger member 92 between the enlarged abutment 94 and the stop 108. Thus, the plunger 92 constantly urges the slide bar member 96 forwardly to maintain the upper lip member 66 in a relaxed position. Actuation of the upper lip control 70, whereby cam follower 104 travels down the inclined cam surface 102, causes the slide member 96 to move against the force of the spring 106. This enables the opposite end of the plunger 92 to push against the depending flange 84 to pivot the lip control member 78, and to thereby urge the lip member 66 to an extended position. As is most clearly set forth in FIGS. 2 and 12, the cable member 72 is retained in a housing 110. The housing member 110 is fastened at 112 to the upper jaw plate member 40. The housing is also provided with a second cable member 114, the utility thereof to be presently described.

In addition to the movable upper lip 66, the soft palate 62 is movable in a manner similar to that of the human being. The head and neck passage 116 contains the roof of the mouth as is illustrated at 60 and includes, in addition to the immovable portion 118, the movable section comprising the uvula or soft palate 62. The movable section 62, is of two parts and comprises the flat forward member 122 and the rearwardly depending member 124. The flat forward member 122 is pivotally retained by means of the pivot pin 126 on the fixed portion of the palate 118. The flat forward member is also provided with a cam surface 128. (See FIGS. 2, 3 and 11.) The stop pin 130 (see FIG. 2) extends from the forward member 122 adjacent the depending member 124 and is adapted to be received in the slot 132 of the depending member 124 to act as stop means. The rear depending member 124 is generally kidney shaped and is normally urged into abutment against the stop pin 130 by means of a hair spring 134, tensioned at 136 and retained on the pivot post 138, which extends through the member 124 and is fastened onto the forward member 122.

As is best seen in FIG. 2, the inclined surface 140 of the cam surface 128 is adapted to cooperate with the inclined surface 142 on the elongated slide bar member 144. The slide bar member 144 is composed of a flat steel material and is elongated in form. The intermediate portion thereof is cut away to provide the inclined surface 142, as is visible in the drawing. The slide bar member 144 is adapted to slide forwardly through the slide housing 146 when urged at one end by the pivot bar 148, pivoting on the pivot post 150. The pivot post 150 is secured to the upper jaw member 40. The opposite end of the elongated slide bar member 144 is adapted to engage the end of the uvula member 62. A tension spring 152, secured to the slide housing 146 at 154 and to the fastening post 156 on the slide bar member 144, constantly urges the slide bar member into the retracted position. As is apparent from FIGS. 2 and 3, the second cable member 114 is the force applied against the pivot bar 148 which causes it to pivot forwardly and to thereby engage one end of the slide bar member 144. The slide bar member in turn slides horizontally through the slide housing 146, thereby enabling the forward end thereof to move the uvula 62 so that the rear depending portion 124 is closer to the tongue in order to emit certain sounds.

The cable 114 extends around the perimeter of the base plate 32 and is held in position under the securing bars 158 by means of the fastening screws 160. The cable member 114 is also turned around the spacer post 162 and into the channel housing 164. The plunger member 166 extends beyond the end of the cable member and is provided with an enlarged head portion 168 (see FIG. 6) and is constantly urged into the forward position by means of the spring 170 mounted thereon and engaging the head portion 168 and the enlarged abutment 172 of the cable member. The opposite end of the plunger member 166 engages the end of the pivot bar 148 and is moved forwardly to pivot the bar when the spring is compressed through the motion of the control member 174 for the uvula.

As is best evident from FIGS. 2, 6, 7 and 8, the uvula control member 174 is provided with a pivot arm or lever 176, pivotally secured at 178 to the fulcrum 180. The fulcrum 180 in turn is secured to the base member 32. The uvula control member 174 is urged to any one of the three positions 182 indicated on the flat opaque surface of the plate 184, through the slot 186. A cable actuator 188 is provided with a depending flange portion 190 adapted to depend adjacent the free end of the plunger member 166 and is engageable therewith when the control member 174 is moved on its pivot point. The cable actuator 188 is fastened at 192 to the bottom of the plate member 184. The screw 192 serves the dual function of a fastening means as well as a pivot post. When the uvula control member 174 is moved forwardly in the slot 186, the cable actuator 188 is engaged by the lever arm 176 to pivot on the screw 192 so that the flange member 190 engages the plunger member 166. Further movement overcomes the force of the spring 170 to move the plunger member on the opposite end against the pivot bar 148. This chain of movement actuates the pivot bar 148 which then urges the slide bar member 144 against the uvula 124. The uvula then pivots on the post 138 to move the uvula closer to the tongue 44. A wire spring 194 is fastened to the post 154 at 196 and urges against the post 198 and on the cam surface 128 of the soft palate 122. This insures the return of the soft palate member to the normal position of the upper jaw.

The support and spacer plate member 76 is retained in spaced apart relation from the base member by means of the spacer post member 162 positioned at the ends of the device. This spacer plate member overlies the simulated head structure and serves to protect it from damage. In addition, as was previously pointed out, this plate member supports the index chart or ring 46. Further, the plate member 184, adjacent the control means 48, is also secured thereto by means of the fastening screws 200. The uvula control member 174 is operated from this plate member, as will presently be described. In addition, the simulation of the vocal chord is actuated by the control knob 202 on the plate 184. This is also true for control of the positions of the lower jaw 42 by means of the indicia illustrated at 204. The description of the operation of the latter two elements will be provided shortly.

The lower jaw member 42 is most clearly illustrated in FIGS. 2, 3, 5, 9 and 10, while the control means therefor are best illustrated in FIGS. 2 and 6 through 8. Referring to FIGS 2, 5, 9 and 10, the lower jaw 42 comprises a two part face mask member 206 and 208. These are constructed of the same material as the upper face portion and are secured to the plastic jaw plate 54 by means of the fastening members 210 and 212. A neck member 214 extends into the transparent area of the device and blends together with the opaque lower jaw mask members 206 and 208 to simulate the lower portion of the face of a person.

The lower lip 216 is pivotally mounted at 218 on the face mask member 206 and is provided with the vertical post 220 to which the flat spring member 222 is secured. The lower lip 216 is moved by operation of the jaw control means 48 as a unit and individually by actuation of the control 246. It should be noted that the flat spring member 222 is trained around one of the fastening members 212 and is fastened to the edge of the flat slide bar 284 at 290 so that it may be flexed forwardly, when in operation.

The tongue member 44 is uniquely adapted to assume all of the possible movements of an actual tongue so that any letter sound in any language may be introduced. While mechanical means previously had been utilized in the construction of a tongue member, the motion made possible by the invention makes it appear to be amorphous in construction to the extent that the student may actually feel that he is seeing the movements of a tongue.

Referring to FIGS. 2, 5, 9 and 10, the tongue member 44 comprises a peripheral, pre-formed flat spring member 224, generally U-shaped in construction and shaped in the manner of a tongue when seen in silhouette. The housing 226 for the tongue control extension wires or slide bar 228 is located between the U-shaped tongue spring member 224 and serves the dual function of retaining in immobile and fixed position the tongue control extensions as well as the spacing means for the tongue. It should be noted that the control extensions 228 extend beyond the longitudinal length of the housing 226 at each end thereof and are slidably retained therein. The ends of the wires extending into the hollow tongue portion 230 are secured by means of a pivoted joint connection 232 to the inner surface of the tongue spring member 224. The other free end of the tongue control extension or slide bars 228 are attached to the individual control members of the lower jaw and tongue control member 48.

It should be noted that the vertical height of the tongue spring member 224 is somewhat greater than the control 228. In fact, the tongue member 224 extends substantially between the plastic jaw plate 54 and the spacer plate member 76 (see FIG. 9). The control wire housing 226 terminates a short distance into the hollow tongue portion 230, while a short cam member 234 is secured by the fastening screws 236 to the housing member 226. As is visible in FIGS. 2 and 3, the cam member 234 is of short length and does not extend quite as far as the tongue control housing 226. This permits the tiny steel ball members 238 to be retained within the hollow tongue portion or reservoir 230, as well as to overflow into the narrow space provided between the forward portion of the housing 226 and the spacer plate member 76. The function of the ball members 238, which are similar to BB shot is to provide the fluid motion necessary for the interior area of the simulated tongue member to be filled at all times, no matter what adjustment has been made for a specific character or symbol of the alphabet. This structural relationship provides one of the unique features of the invention whereby the close similarity to the amorphous nature of the human tongue is simulated. The strap member 240 is secured at 242 to the cam member 234 and includes depending flange member 243 (see FIG. 6). The flange member 243 serves as a guide and housing along which the tongue member 224 slides when actuated by the control member 256. A second guide member 244 is positioned adjacent the other side of the tongue member 224 and acts as a guide and housing when that side of the U-shaped tongue is operated by its control member 248.

The control for the lips, the jaw, and the tongue are contained in the control means 48. These control means are illustrated in greater detail in FIGS. 2, 3, 6 and 8 and comprise an upper and lower lip control means 246 and a tongue control means 248, 250, 252, 254 and 256. The entire lower jaw may be adjusted by grasping the control housing 48 and pivoting it to the left or to the right on the pivot post means 258 (see FIG. 2) through any one of the positions indicated by the indicator 260, which has been secured to the control means 48 and extends over the jaw positions 1, 2, 3 or 4 as shown in FIG. 2. When the jaw control means 48 is pivoted on pivot post 258, the entire plastic jaw plate 54, which contains the lower jaw member and tongue is moved within the limits provided by the stop pins 262 and the engagement of the upper lip member 70 with the adjustment means 264. The adjustment means 264 is secured to the base plate by conventional fasteners 266 extending into the spacer posts 267. The member 264 is provided with a slot at one end which overlies the jaw plate member 54 so that the set screw 268 may extend therethrough into friction engagement with the plate member 54. In this manner the lower jaw and tongue control 48 is restrained against accidental movement once adjusted into any one of the selected positions of the jaw member.

Figure 6:
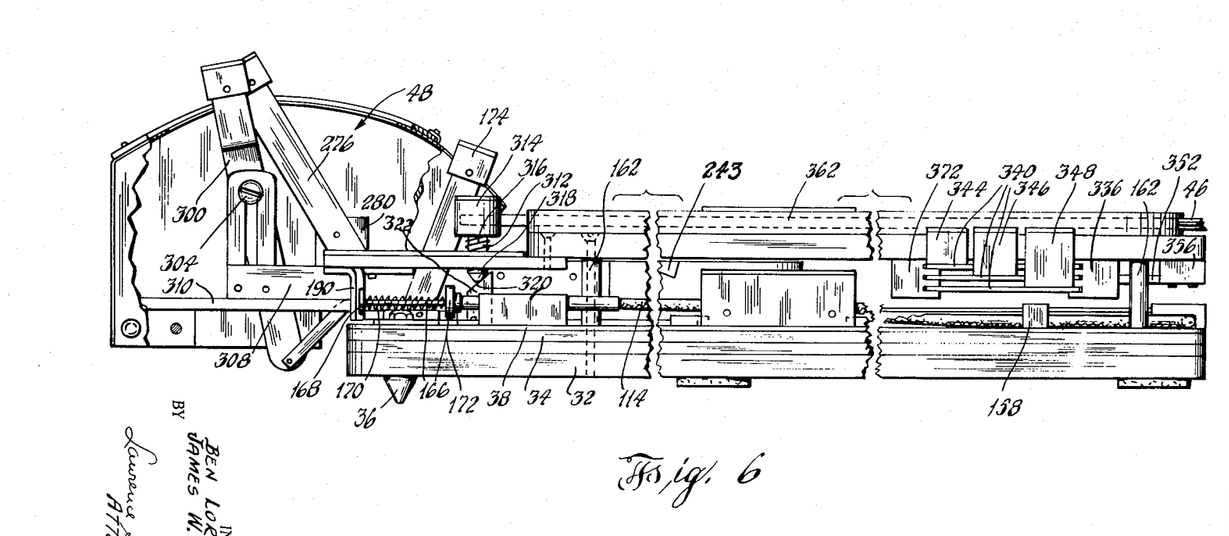
FIG. 6 is a side elevation of the control elements as is shown by line 6—6 of FIG. 2 of the drawings.
Figures 7, 8:
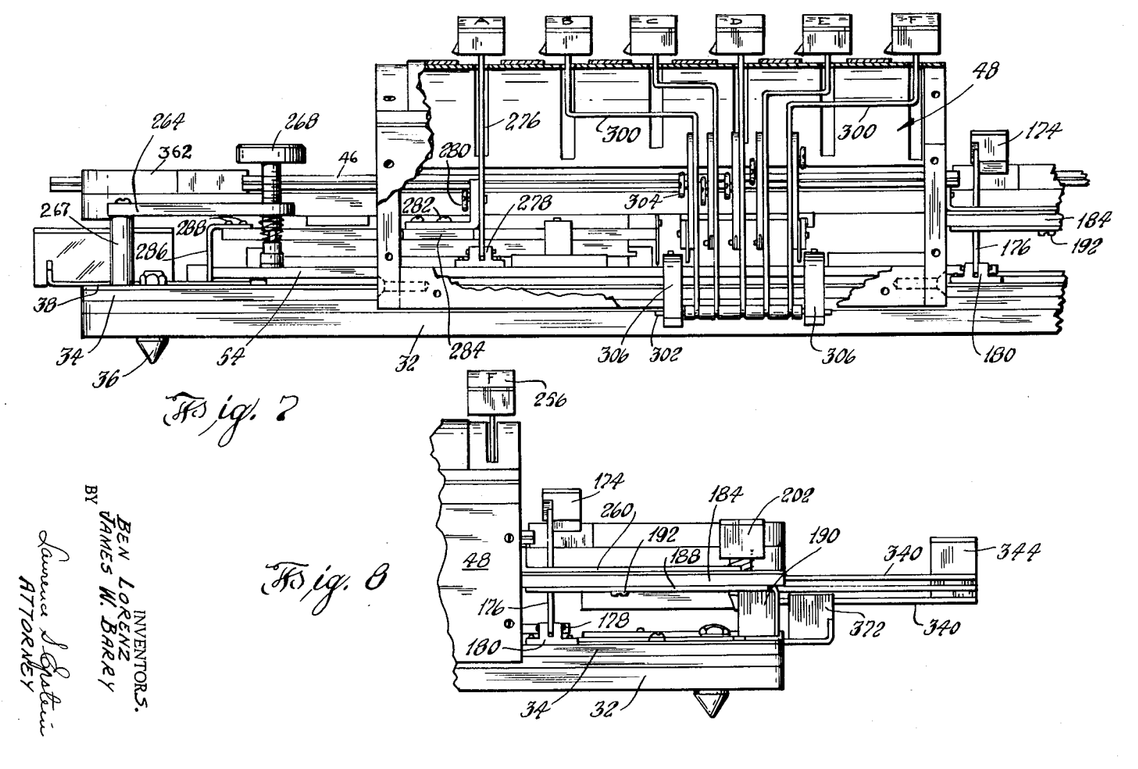
FIG. 7 is an end elevation illustrating the control elements.
FIG. 8 is an enlarged fragmentary elevation of the control elements shown in FIGS. 2 and 6.
Figure 8:
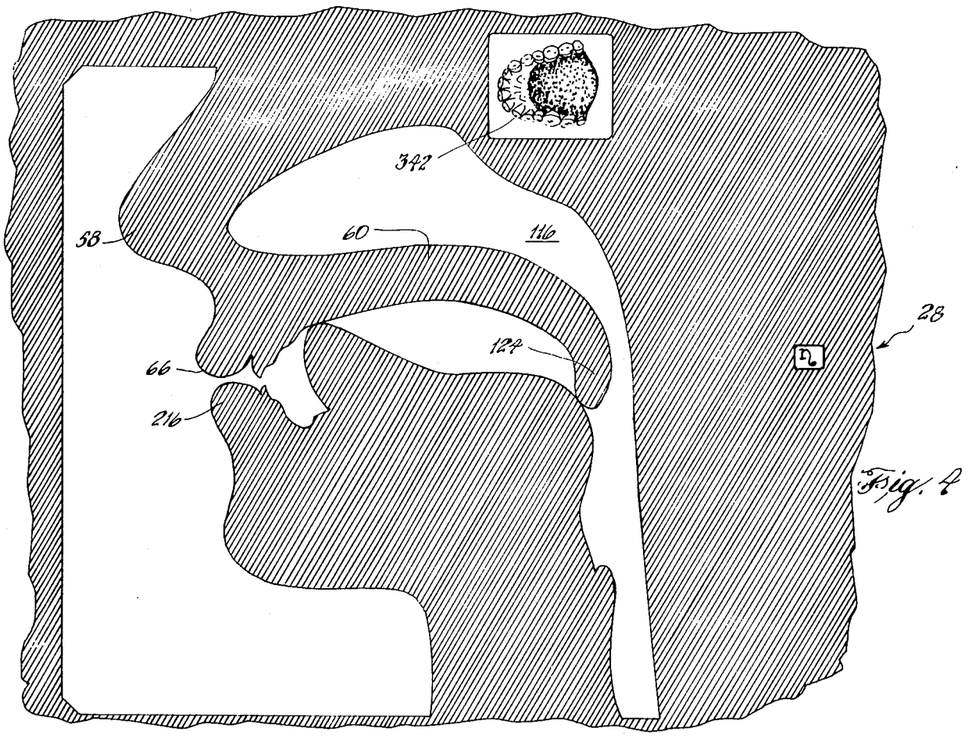

In order to simultaneously move the lip members 66 and 216, the control means 246 is movable through its elongated slot 270 provided in the control plate 48. As can be seen from FIGS. 2 and 3, the lip members are capable of being adjusted between 1 through 4 positions. The control knob has been designated with the letter "A" primarily for ease in identification and includes an index pointer 272 in order to permit the control knob "A" to be positioned precisely as is desired by the instructor. The legend "Lips" is provided at 274 to identify the structure that will be actuated. The movement of the lips lever 246 is best illustrated in FIGS. 6 through 8 and provides a lever arm 276, pivotally retained at 278 for movement through a lost motion member 280. The lost motion member 280 is fastened at 282 to the flat slide bar 284. The slide bar 284 in turn is connected to the track member 98 by means of the L-shaped bar 286. The L-shaped bar 286 is fastened at 288 directly to the slide bar and is welded or otherwise secured as an integral portion of the slide bar 96. It should be noted that the flat spring member 222 is riveted to the slide bar 284 at the opposite edge thereof at 290 (see FIG. 3) so that when the control member "A" is moved through positions 1 through 4, the cable member 72 is moved by the slide bar 96 to actuate the upper lip 66 while the flat spring member 222 is flexed outwardly to actuate the lower lip member 216. The limit of movement of the lip control member is provided by the length of the elongated slot 270.

Figure 3:
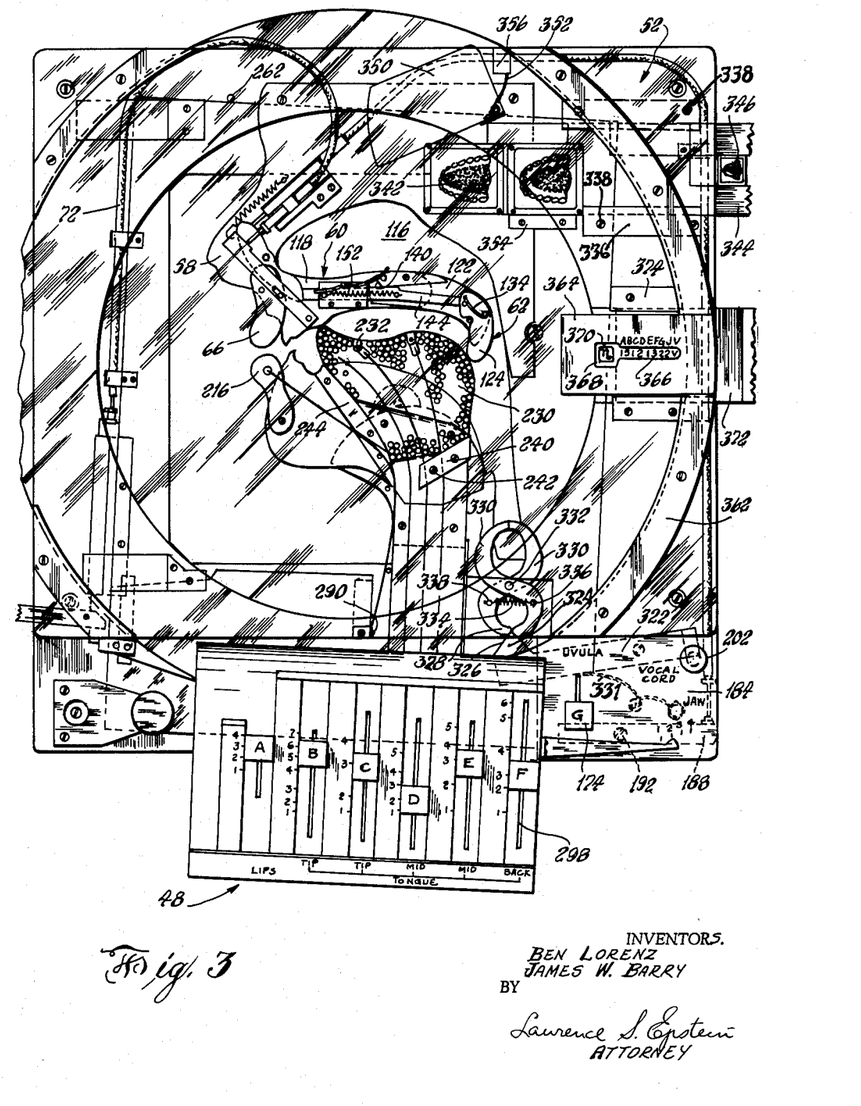
FIG. 3 is a plan view of the invention illustrating another sound with certain parts removed for clarity.
Figure 5:
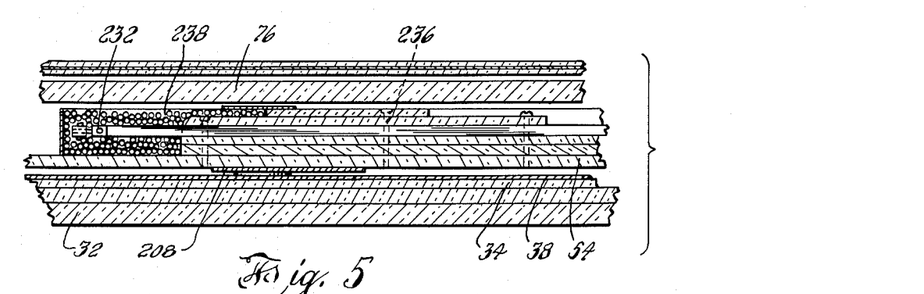
FIG. 5 is a section taken on line 5—5 of FIG. 2 to illustrate the simulated tongue structure.

Movement of the tongue member 44 is controlled by the control elements 248, 250, 252, 264 and 256. As is apparent from inspection, the control knobs "B" and "F" actuate the flat spring member 224, which constitutes the outline of the tongue, while the elements labeled "C," "D" and "E" actuate the specific extensions 228 as indicated by the legends "Tip" at 292, "Mid" at 294 and "Back" at 296. The elongated slots 298 permit the necessary movement thereof. Each of the tongue control members is provided with a lever arm 300. Each of the lever arms 300 is pivotally turned by the pivot rod 302 for pivoting motion through the lost motion slot means 304. The pivot rod 302 is secured to the bars 306, which in turn are fastened to the base member. The tongue element 224 is connected to a stiff bar 308, which in turn is connected to its lost motion means 304 to insure durability and to prevent failure in case of continued use and abuse. Otherwise, if desired, the tongue element 224 could be secured directly to the lost motion means 304. The control means 48 is secured to the base plate in any desired manner. The position of the tongue differs in FIGS. 2 and 3, for purposes of illustrating adjustment. For example, in FIG. 2, all of the control elements have been brought to the numeral "one" position where no particular sound is depicted. In FIG. 3, the controls have been moved into different positions to illustrate a specific form of sound.

The simulation of the vocal chord in the human being is provided by the vocal chord control 202, referred to above and secured at 310. As is best evident in FIGS. 2, 3 and 6, the vocal chord member comprises a slide bolt 312, actuated by the control button 314, for downward movement against the force of the spring 316. The slide bolt 312 is provided with a tapered edge 318 adapted to seat against the inclined surface 320 of the pivot bar 322. The pivot bar 322 in turn terminates in a wedge shaped extension 324. The tapered edges 326 of the wedge extension 324 ar adapted to extend between the lower free extremities 328 of a pair of S-shaped members 330 by means of the wire spring 331. The S-shaped members are connected in opposed relationship to each other, and for pivoted motion at 332, as is illustrated in FIGS. 2 and 3 so that they resemble pincer means for a figure "8". Since the tension spring 334 is secured at one end 336 to one of the S-shaped members and its opposite end at 338 to the other of the S-shaped members 330, the tendency is to retain them in the closed position illustrated in FIG. 3. This is prevented by the fact that the pivot bar 322 is normally urged by the spring 331 between the extremities 328, causing the S-shaped vocal chord members 330 to assume the position of FIG. 2. However, when the force of the spring 316 is overcome by downward pressure on the vocal chord knob 314, the pivoting motion of the pivot bar 322 overcomes the force of the spring 331 and causes the wedge-shaped extension 324 to withdraw from the extremities 328, permitting the spring 336 to close the S-shaped elements into the figure "8" position shown in FIG. 3. The projection on the screen which symbolically shows the vocal chord members in position is illustrated in FIG. 1.

The description so far relates to the projection of the side view of a tongue. Very often, it is desirable to illustrate the plan view of the tongue while it is being described in relation to its side view position. The means to do this has also been provided on the device itself and in a manner designed not to interfere with the simulation of the particular sound. The plan view of the tongue shape is illustrated in FIGS. 2 and 3 and is designated generally by the numeral 52. A side elevation of this structure is illustrated in FIG. 6. A pair of spaced apart track means 336 are secured at 338 to the spacer plate member 76 in a position depending beneath the surface thereof and extending between the space provided between the spacer member 76 and plastic jaw plate member 54. A plurality of longitudinal tracks are provided to receive slidably therein the slide bars 340, each retaining a transparent illustration of the tongue 341 in one of three selected positions as a top view at 342. The actuator button for each of these transparencies of the tongue are provided at 344, 346 and 348 respectively. These actuating control means include a plastic illustration of the shape of the tongue contained in the specific transparency. Thus, as is visible in FIG. 3, the transparent tongue member 342 has been moved into viewing position and is matched in appearance on the actuating bar 346, while the actuating bar 344 is aligned with another transparency which is not visible on the screen. Referring to FIGS. 2 and 3, the window cutout 64 of the upper jaw member 40 is positioned so that it overlies the transparent portion of the tinted plastic plate 34. Thus, when the actuator bar 346 is slid forwardly in the tracks provided by the means 336, it is adapted to move into position overlying the window section 64 to become exposed to view on the overhead screen. This is accomplished by pivoting the cover mask 350 out of its normal position overlying the window 64. The cover mask 350 is normally tensioned by the spring 352 against the edge of the auxiliary track member 354. The spring 352 is attached at 356 to the spacer plate member 76. The enlarged area of the slide bar 340 engages the cover mask 350 in the forward motion to pivot out of the way.

The problem of demonstrating the International Phonetic Alphabet has been reduced to a minimum with the provision of the alphabet index chart 46. The chart 46 is illustrated in the plan views of FIGS. 2 and 3 and comprises a clear plastic ring member. On the ring member, the various sounds which comprise the International Phonetic Alphabet are provided, as is illustrated at 358. In addition, the type of sounds that they illustrate are provided with legends at 360 to identify the specific groupings. The circular track member 362 rotatably retains the index chart 46 for planar adjustment. The viewer housing 364 is open at both ends to receive the International Phonetic Alphabet ring therethrough and extends from the circular track means 362 and is provided with an elongated slot 366 terminating in a slightly enlarged window 368. The enlarged window overlies the frame opening 370 directly beneath. The frame opening 370 in turn overlies a circular aperture in the metal plate 38 (not shown). Thus, when the closure member 372 is slid outwardly in the track 374, the phonetic letter is exposed and is projected onto the overhead screen. It should be noted that the numerals 376 on the alphabet ring do not project onto the screen since the housing 364 is opaque beneath.

Figures 15, 16:
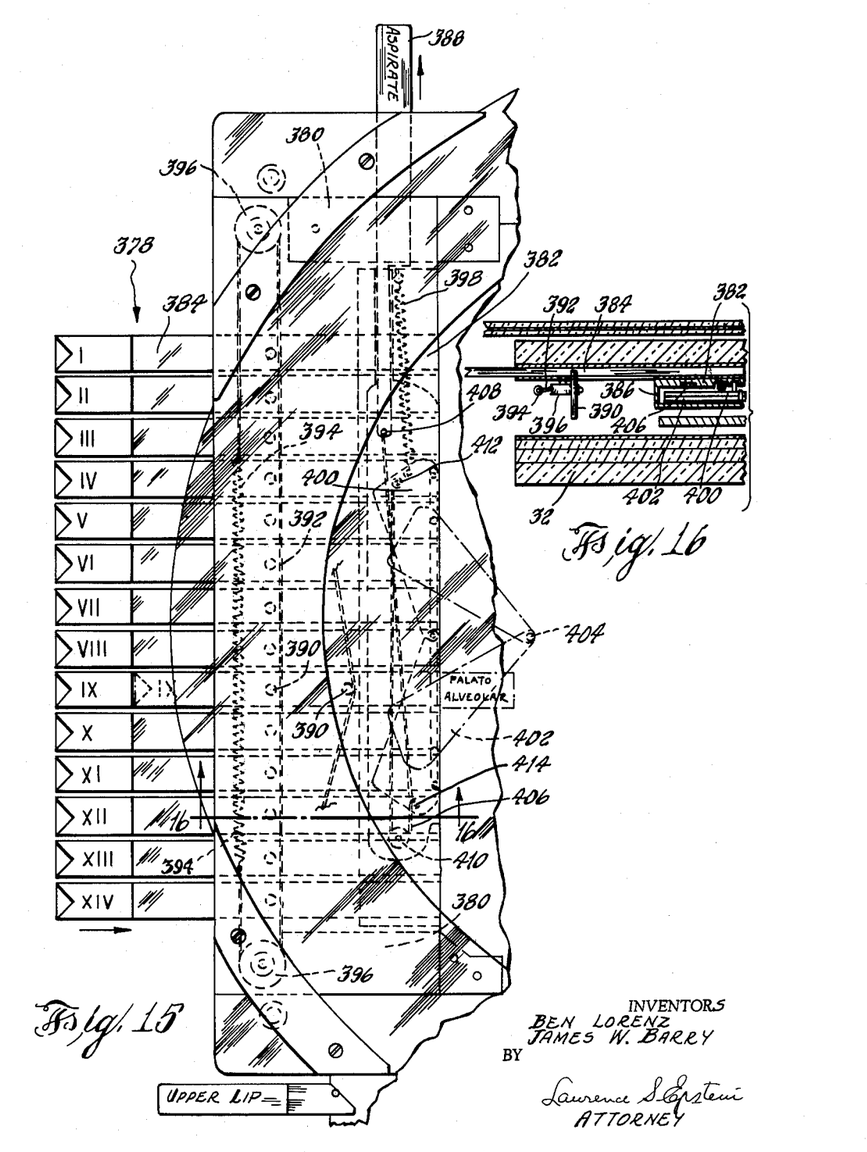
FIG. 15 is a plan view of the accessory unit illustrating aspiration.
FIG. 16 is a section taken on line 16—16 of FIG. 15.

In some instances it may be desirable to illustrate the fact that an aspirated sound has been produced. Further, it may be desirable to indicate to the student what type of sound is being produced. To illustrate this, the auxiliary member 378 (see FIGS. 15 and 16), is provided. This accessory unit relates to certain sounds and also provides a visual key in naming the type of sound, i.e., nasal, bi-labial, etc. This is not necessary to the projection of a phonetic sound and may be eliminated, if desired. Where it is to be used, the auxiliary member 78 is retained on the spaced apart parallel slide holders 380. The housing 382 for the indicators 384, together with the housing 386 of the aspirator 388 provide the track means to be retained upon the slide holders 380. The indicators 384 are illustrated in the figures as 14 in number and are designated to visually define the type of sound being formed by the demonstrator. For example, the slide 384, having the roman numeral I, when moved forwardly into view, contains the legend "front vowels". The slide indicator bearing the legend "II," when moved forwardly contains the legend "Mid vowels" in a like manner, each one of the 14 indicators provides the visual key relating to the particular sound that might be projected on to the screen. As is illustrated in FIG. 15, the slide indicator "IX" has been moved forwardly to project into view the legend "Palato Alveolar." Each slide indicator is provided with a depending pin 390, against which the endless wire cable 392 engages. When the indicator 384 has been moved forwardly, the cable is stressed into the second position illustrated in the figure by overcoming the force of the spring 394, comprising part of the cable. The endless cable is trained around the pulleys 396.

Where it is desired to visually demonstrate an aspirated sound, the aspirator actuator 388 is pulled outwardly to cause the spring 398, attached to one tapered aspirator element 400, to stretch. This simultaneously causes the second aspirator element 402 to pull outwardly on the pivoted connection 404. The cable 406 is attached at 408 to the inward end of the aspirator actuator 388 and is trained around the pulley 410, securing at its other end to the tapered aspirator element 400, as shown at 412. It should be noted that the cable member 406 makes a turn around the pin 414 of the second tapered aspirator element 402 so that both act in unison.

From the above description of the component parts of the device, the use thereof will be readily apparent. In FIG. 3, a specific example has been provided to illustrate the formation of a speech sound. This particular sound is provided in Section II of the International Phonetic Alphabet and represents a "retroflex" type of sound. To position the mouth and tongue in the required shape, the key to be followed is indicated by the numerals 376 exposed to view in the elongated slot 366 of the housing 364. With this code available, it is a simple matter to position the control levers 246 through 256 in the manner indicated by the key so that the lips and the tongue assume the shape of the sound to be formed. The uvula control member 174 is then adjusted to the position found under the letter "G" provided on the viewing housing surface 364, while the jaw position is moved as indicated at 260. Since this represents a sound in which the vocal chord is utilized, the letter "V" appears under the V on the housing 364 and the knob 262, representing the vocal chord and is depressed to position the S-shaped elements 330 into the position found in FIG. 3. The ball members 238 completely fill the hollow cavity 230 so that the wire members 228 are not visible on the overhead screen. The operation of the cable plunger members move the upper and lower lip members 66 and 216 to the correct position while the uvula is urged downwardly to a position closely adjacent the back of the tongue. If the instructor so desires, he may illustrate the position of the tongue against the roof of the mouth by actuating the bar 346. Should the instructor desire to illustrate to the class the group of sounds that are being formed, he may insert the sound designator 378 on to the slide holders 380 and urge the selected indicator 384 inwardly against the endless cable 392. When an aspirated type of sound is being illustrated, the aspirator 388 would be actuated to permit this to be visible on the screen. It should be noted that no control movement in the component part is mechanically linked to any other so that each degree of movement is directly under the control of the instructor or operator. This allows each degree of movement to be demonstrated or repeated without disturbing or affecting any other position of the organ. It should also be noted that the device is adapted for use in making slides or movie films to permanently reproduce a specific speech sound movement.

Obviously many modifications and variations of the present invention are possible in the light of the above teachings. It is therefore to be understood that within the scope of the appended claims the invention may be practiced otherwise than as specifically described.

What is claimed is:
1. In a language demonstrator adapted to be used for overhead projection,
support means,
vocal organ simulating means secured to said support means, said vocal organ simulating means comprising,
an upper jaw member,
an upper lip member pivotally secured to said upper jaw member, said upper lip member and said upper jaw member lying in different planes,
upper palate means secured to said upper jaw member,
a lower jaw member,
a lower lip member pivotally secured to said lower jaw member, said lower lip member and said lower jaw member lying in different planes,
tongue means, said tongue means being adjustable to assume various positions,
and control means individually controlling the vocal organ simulating means, whereby an infinite number of positions of the vocal organs may be artificially reproduced to visually demonstrate any sound.
2. The combination of claim 1, wherein said upper jaw includes a pivot bar, slot means in said upper lip member,
pivot means on said bar and extending into said slot means,
and pressure control means secured to said support means and engaging said pivot bar, whereby operation thereof causes said pivot bar to pivot said upper lip member.

3. The combination of claim 2, wherein said pressure control means comprises a cable having a plunger,
a second bar means movably secured to said support means and engaging one end of said plunger,
and means actuating said second bar member to move said plunger and said upper lip member.

4. The combination of claim 1, wherein said upper palate means comprises,
a hard palate member,
means securing said hard palate member in fixed position on said upper jaw means,
and a soft palate member,
said soft palate member comprising a flat forward member and a rearwardly depending member,
means pivotally securing said flat forward member to said hard palate member,
means pivotally securing said depending member on said flat forward member,
and separate stop means on said flat forward member limiting movement of the depending member, whereby simulation of the movement of the uvula is visually demonstrated.

5. The combination of claim 1, wherein said lower jaw member includes a fixed portion and a movable portion;
means pivotally mounting said lower lip member on said movable portion,
control means secured to said movable jaw portion and to said lower lip member to actuate both lip members simultaneously,
and control means secured to said upper lip member to move it individually.

6. The combination of claim 1 wherein said tongue means comprises a generally U-shaped spring member conforming to the outline of a tongue and secured to said control means,
and means on said control means operatively connected to said U-shaped spring member to distort portions of said spring whereby the amorphous flexibility of an actual tongue is simulated.

7. The combination of claim 6,
and housing means enclosing said tongue means,
wire means secured to said U-shaped spring member and to said control means,
individual controls connected to said wire means to manipulate each one separately whereby the tongue is distorted,
and ball means within said housing,
said ball means being freely retained so that the amorphous character of the tongue is simulated.

8. In a language demonstrator adapted to be used for overhead projection,
support means,
vocal organ simulating means comprising upper jaw means, lower jaw means and tongue means,
means securing said vocal organ simulating means to said support means,
control means secured to said vocal organ simulating means, whereby an infinite number of positions of the vocal organs may be artificially reproduced to visually demonstrate any sound,
and alphabet index chart means rotatably mounted on said support means, said chart means having language sound symbols thereon,
said index chart means including means to align a selected language sound symbol with said language demonstrator control means whereby the sound to be simulated is identified with the International Phonetic Alphabet code.

9. The combination of claim 8, wherein said alphabet index chart means comprises an annular ring,
sound indicating indicia marked on said ring,
and track means secured to said support means receiving said ring for rotating movement.

10. The combination of claim 9, wherein means to illustrate aspirated sound is provided, said means comprising,
an auxiliary member retained on said language demonstrator,
slide holder members movably mounted on said auxiliary member, said slide holder members illustrating selected types of sounds,
endless cable means engaging said slide holders,
aspirator elements pivotally retained on said auxiliary member,
and aspirator actuating means secured to said aspirator elements, whereby movement thereof actuates said aspirator elements to illustrate an aspirated sound simulation.

11. In a language demonstrator adapted to be used for overhead projection,
a support member,
a frame member mounted on said support member,
means to simulate the vocal cords secured on said frame member,
said means comprising a pair of opposed, S-shaped members,
means pivotally securing said S-shaped members to said support means,
and means actuating said S-shaped members to open or closed position.

12. The combination of claim 11 wherein said actuating means comprises,
a pivot bar,
wedge means on said pivot bar and extending into said S-shaped member in normal position to retain it in open position,
and means actuating said pivot bar to pivot it away from said S-shaped member whereby the latter closes to simulate the vocal cords.

13. A simulated tongue member adapted to be used to illustrate various positions of the tongue in simulating human sound comprising,
support means,
a generally U-shaped spring member conforming to the outline of a tongue and mounted on said support means,
control means,
and means on said control means operatively connected to said U-shaped spring member to distort portions of said spring whereby the amorphous flexibility of an actual tongue is simulated.

14. The combination of claim 13 and including
a housing,
wire means slidably retained in said housing,
said housing and spring member providing a reservoir area,
said wire means being secured to said U-shaped spring member and to said control means, whereby the tongue is distorted to any desired position,
and ball means in said reservoir area whereby the amorphous character of the tongue is simulated.

15. The combination of claim 14, wherein said control means comprises,
pivot rod means secured to said support means,
said pivot rod means including a lost motion slot,
a lever arm for pivoting movement,
said lever arm including pivot means extending into said lost motion slot, and said lever arm engaging said wire means to provide slidable movement of the wire means in said housing to thereby actuate the tongue member.

16. A simulated uvula adapted to be used with a simulated tongue member to illustrate phonetic sounds comprising, a support member, means simulating the roof of a mouth and mouth cavity secured to said support member, a hard palate member extending from said mouth roof simulating means into said mouth cavity, a soft palate member overlying said hard palate member and extending rearwardly into the mouth cavity, said soft palate member comprising a flat forward member and a rearwardly depending member, means pivotally securing said flat forward member to said hard palate member, means pivotally securing said depending member on said flat forward member, and control means slidably retained on said flat forward member and engaging said rearwardly depending member to simultaneously actuate both the forward and rearward members.

17. The combination of claim 16 wherein said control means includes, guide means on said hard palate member, a lever pivotally secured to said hard palate member, one leg of said lever extending through said guide means and engaging one end of said flat forward member, tension means secured to said lever leg and anchored on said guide means to retract said lever.

and plunger means positioned on said support member and engaging the other leg of said lever, whereby actuation of said plunger causes the lever to pivot and move the simulated soft palate member.

18. The structure of claim 17 wherein, said flat forward member includes a guide portion, and said one lever leg includes a slot, said slot riding on said guide portion to move the flat forward member downwardly prior to engaging the flat rearwardly depending member.

19. A simulated face for teaching languages comprising, a frame support member, upper and lower jaw members secured on said support member, a movable lip member pivotally secured to said upper jaw member, a movable lip member pivotally secured to said lower jaw member, a first control means connected to said upper and lower lip members, for simultaneous movement of the lips, a second control means connected to said upper lip member for movement of the upper lip alone, and a slide bar slidably secured on said frame support member, said slide bar being engaged by both control means to move the upper lip member, said first control means including a spring member, said spring member being secured to said lower lip member, whereby actuation of said first control member moves the spring and slide bar simultaneously to move both the upper and lower lip members.

References Cited by the Examiner

UNITED STATES PATENTS

| | | | |
|---|---|---|---|
| 1,850,899 | 3/32 | Smith | 35—35 X |
| 2,472,114 | 6/49 | Marder | 35—74 |
| 2,574,838 | 11/51 | Olson | 35—17.1 |
| 2,841,889 | 7/58 | Coale et al. | 35—39 |
| 2,958,957 | 11/60 | Domeshek | 35—25 |

EUGENE R. CAPOZIO, *Primary Examiner.*

GEORGE NINAS, Jr., LAWRENCE CHARLES, JEROME SCHNALL, *Examiners.*